June 13, 1967  L. W. BOECK  3,325,216
AUTOMATIC TAIL GATES FOR DUMP TRUCKS AND THE LIKE
Filed Sept. 15, 1965  3 Sheets-Sheet 1
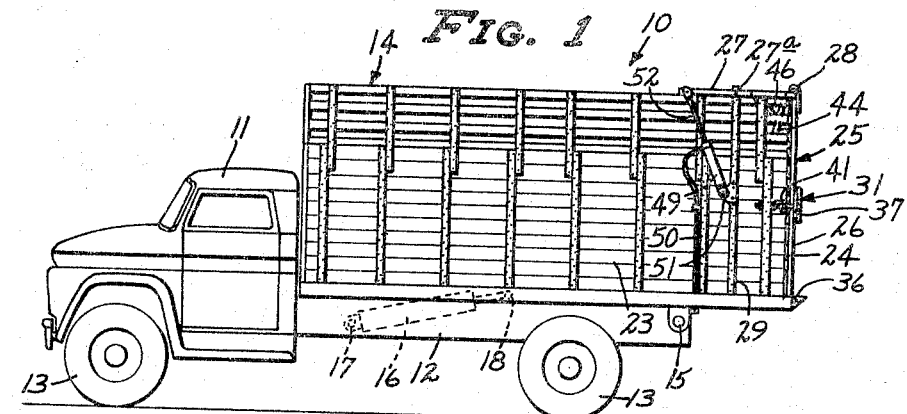
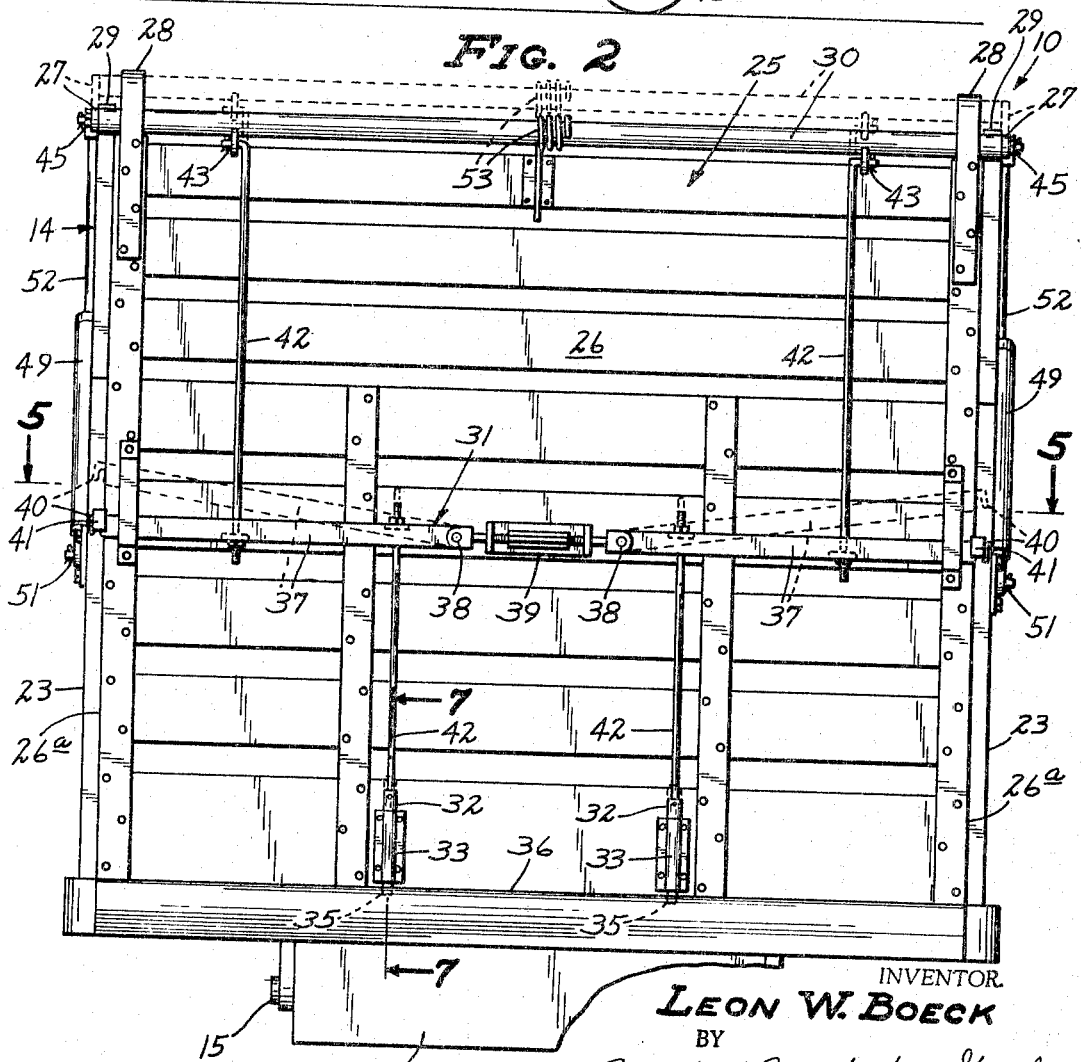
INVENTOR.
LEON W. BOECK
BY
Merchant, Merchant & Gould
ATTORNEYS

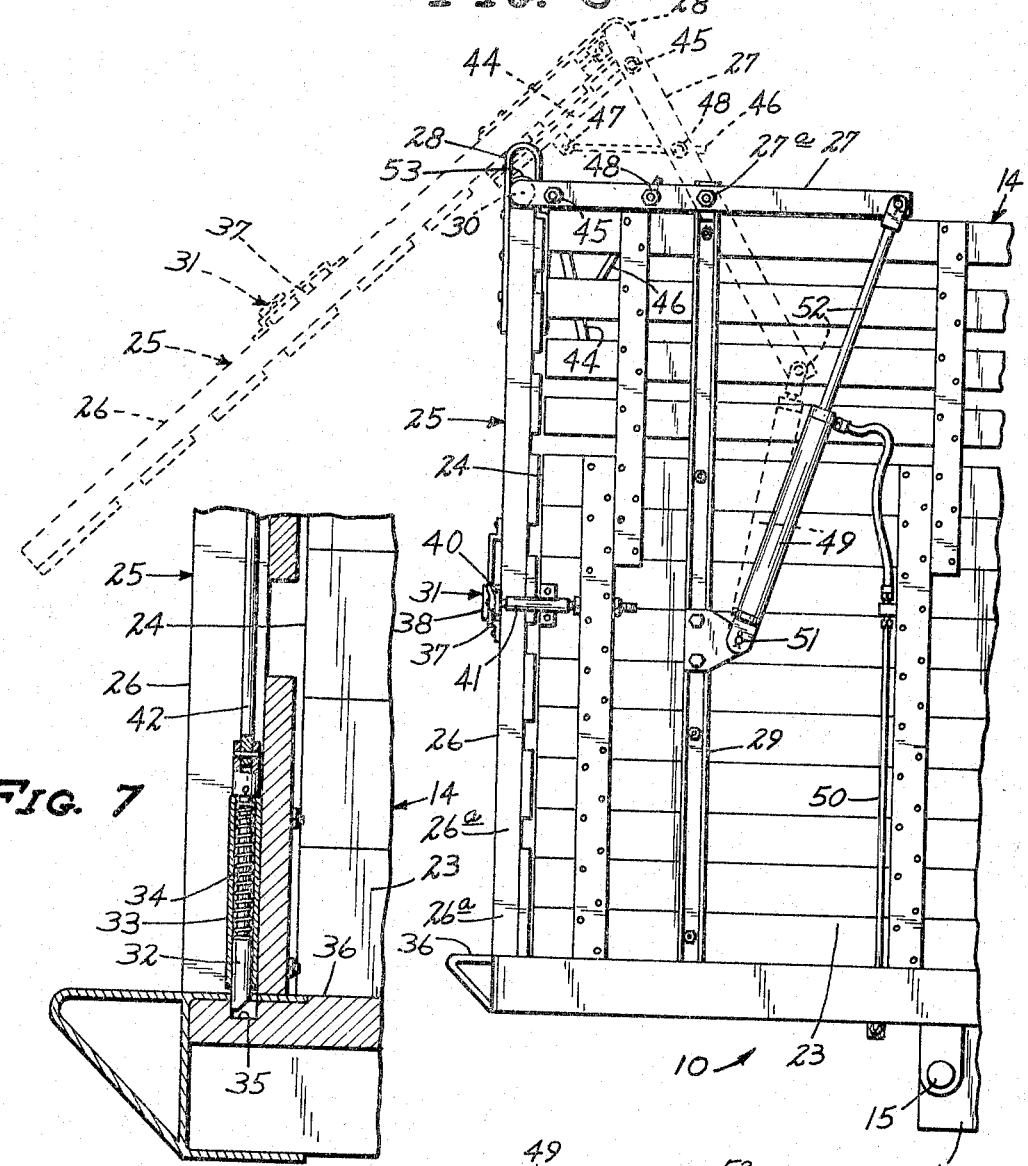
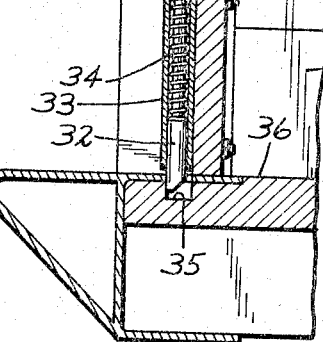
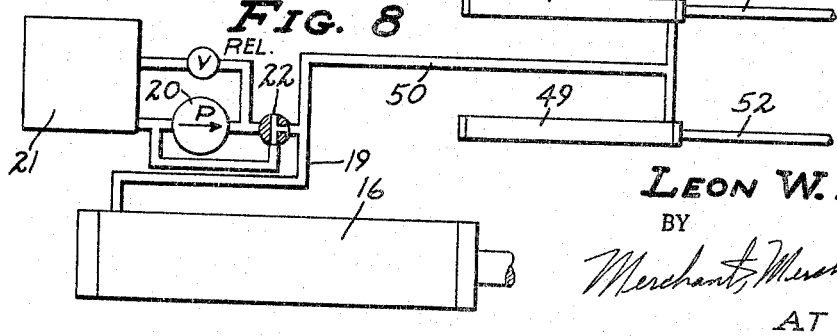

June 13, 1967 — L. W. BOECK — 3,325,216
AUTOMATIC TAIL GATES FOR DUMP TRUCKS AND THE LIKE
Filed Sept. 15, 1965 — 3 Sheets-Sheet 3
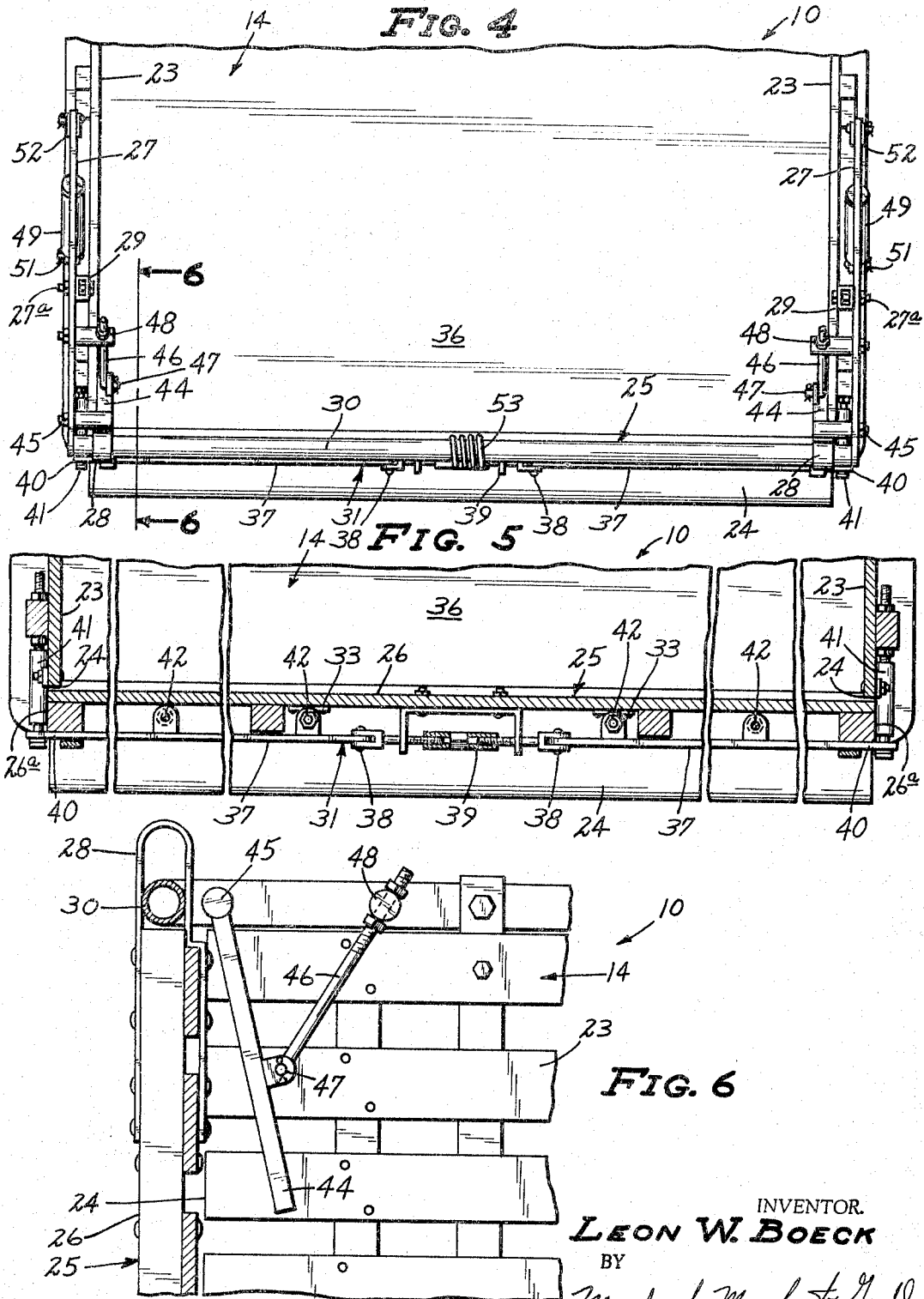

United States Patent Office 3,325,216
Patented June 13, 1967

3,325,216
AUTOMATIC TAIL GATES FOR DUMP
TRUCKS AND THE LIKE
Leon W. Boeck, Rte. 1, Easton, Minn. 56025
Filed Sept. 15, 1965, Ser. No. 487,387
8 Claims. (Cl. 298—23)

My invention relates generally to end or tail gates for dump trucks and the like, and more particularly to power-operated devices of this character.

Normally, in devices of the character above generally described, the tail gates are releasably locked to the bottom and/or sides of the dump box so as to prevent the load, being carried in the box, from escaping during transport. Consequently, it is necessary to manually trip or unlock this mechanism prior to imparting raising-unloading movements to the box. Depending upon the extent of the load and the mechanical condition of the locking mechanism, this operation may be time-consuming and otherwise unsatisfactory.

The primary object of my invention is to provide completely automatic means for mounting the tail gate to the box and associating same with the power-operated means normally found on the truck, whereby the tail gate may be completely unlocked and swung upwardly and rearwardly with respect to its closure-forming position immediately prior to pivotal swinging-unloading movements being imparted to the box.

A further and highly important object of my invention is the provision of a device of the class immediately above described wherein the controls for successively unlocking the gate from the box and raising same to an unloading position are the same as those utilized to hoist the box.

A further object of my invention is the provision of a device of the class described which is inexpensive to produce, is extremely easy to operate, and is foolproof in its operation.

A still further object of my invention is the provision of a device of the class described wherein adjustable means is provided for holding the tail gate out at almost any desired angle, and in which the tail gate is free to swing rearwardly beyond the position in which it is held by the adjustable push arms associated therewith.

A further object of my invention is the provision of a device of the class described which can be inexpensively assembled on truck bodies at the factory, or, alternatively, which can be easily mounted on existing dump truck bodies.

The above and still further objects of my invention will become apparent from the following detailed specification, appended claims, and attached drawings.

Referring to the drawings wherein like characters indicate like parts throught the several views:

FIG. 1 is a view in side elevation of a conventional dump truck such as that normally used in farm operations, showing my novel tail gate mechanism mounted thereon;

FIG. 2 is a view in rear elevation of the structure shown in FIG. 1, portions thereof broken away and on an enlarged scale;

FIG. 3 is a fragmentary view in side elevation of the structure shown in FIG. 2 as seen from right to left;

FIG. 4 is a view in top plan of the structure shown in FIGS. 2 and 3;

FIG. 5 is a view in horizontal section as seen from the line 5—5 of FIGS. 2;

FIG. 6 is an enlarged view in section as seen from the line 6—6 of FIG. 4, portions thereof broken away;

FIG. 7 is an enlarged view in vertical section as seen from the line 7—7 of FIG. 2; and FIG. 8 is a diagrammatic view of the hydraulic system utilized to sequentially release the locking mechanism, lift the tail gate and cause unloading action of the dump box.

Referring with greater particularity to the drawings, there is shown a conventional dump truck 10. Truck 10 includes a cab 11, frame 12, wheels 13, and dump box 14, pivotally mounted as at 15 to the frame 12 for vertical unloading movements thereof. Conventional means for imparting such unloading movements is in the nature of a fluid pressure operated device such as a hydraulic cylinder 16, having one end pivotally secured, as at 17, to the frame 12 of truck 10 and the other end thereof pivotally secured to the dump box 14 as at 18. A conduit 19 leads from cylinder 16 to a pump 20 and reservoir 21, which supplies the pressure for cylinder 16. Interposed in the conduit 19 and normally positioned in the cab 11 of truck 10 is control mechanism in the nature of a valve 22. Dump box 14 further includes the upstanding stake sides 23 and an open discharge side or rear 24.

Gate structure for said open rear end 24 is indicated generally by the numeral 25 and includes a gate element 26 which is adapted to close said open rear end 24. Mounting the upper end of gate element 26 for upward and outward swinging movements away from the discharge side 24 is means, including lost motion mechanism, which is comprised of a pair of horizontally disposed levers 27. One each of the levers 27 is pivotally secured, as at 27a, to the upper end of a pair of vertical braces 29 carried, one each by the upstanding sides 23 of box 14, in forwardly spaced relation to the discharge side 24 thereof. For the purpose of pivotally securing the gate element 26 to the levers 27 and providing lost motion therebetween, for reasons which will hereinafter become apparent, I provide the vertically elongated bearing elements 28. Bearing elements 28 are in the nature of generally U-shaped strap material suitably secured to the upper end portion of the gate element 26, one each adjacent an opposite side edge 26a thereof. A horizontally disposed trunnion means in the nature of a rigid cylindrical bar 30 is secured to and extends between the outer or rear ends of the levers 27 and is slidably received through the bearings 28 to permit free swinging movements of the gate element 26 with respect thereto during all unlocked positions of the gate element 26.

Locking mechanism indicated generally by the numeral 31 is adapted to releasably secure the gate element 26 to the discharge end 24 of box 14. Locking mechanism 31 includes a pair of lower latch bars 32, each of which is mounted for vertical sliding movements within a housing 33 carried by the gate element 26. Coiled compression springs 34 bias the latch bars toward reception within cooperating recesses 35 formed in the floor 36 of box 14. A pair of upper latch bars 37 are also provided and have their inner ends pivotally secured, as at 38, to a bracket 39. Bracket 39 is carried by the gate element 26 centrally thereof, and permits vertical swinging movements of the outer hook-equipped ends 40 of latch bars 37 into and out of locking engagement with cooperating hook elements 41, one each carried by one of the sides 23. Linkage such as the vertically disposed rods 42 operatively connect the latch bars 32, 37 to the trunnion-forming bar 30, as at 43, and impart vertical unlatching movements to the latch bars 32, 37 during lost motion movement between the trunnion means 30 and vertically elongated bearing means 28.

Further included in the lost motion mechanism is a pair of rigid arms 44. The upper ends of arms 44 are each pivotally secured to one of the levers 27 intermediate the pivotal connection 27a thereof and the trunnion means 30, as at 45. Arms 44 depend from their respective lever 27 in a downwardly diverging relationship to the adjacent plane of the gate 26 and are held in such a relationship by means of the brace rods 46. As shown, one end of each of the brace rods 46 is secured to its respective arm 44 as at 47 with the other end of each thereof secured to its respective lever 27 forwardly of the pivotal connection 45 as at 48. It will be noted that rod 46 is secured to lever 27 in such a manner to permit adjustment of the diverging relationship of the arm 44 with respect to the plane of the gate 26. Thus, the gate 26 may be moved upwardly and outwardly from the open discharge side 24, upon engagement of the arm 44 with gate 26, a greater or lesser amount as the situation or load requires. Such adjustment also assures that the latch mechanism 31 will be completely released before such upward and outward movement of the gate 26.

Power means for successively operating the lost motion mechanism to release the locking mechanim 31 and thereafter impart movements to the gate element 26 upwardly and outwardly of the discharge side 24 of box 14 is in the nature of a pair of secondary fluid pressure operated cylinders 49. Cylinders 49 are operatively connected to the main or primary cylinder 16, between such cylinder 16 and the control valve 22 therefor, by means of the fluid conduit 50. One end of each of the cylinders 49 is pivotally connected to one of the vertical braces 29, as at 51, and the other end (or piston-equipped rod 52) is connected to a forward extension of the lever 27. Thus, operation of gate structure 25 is effected by retraction of piston rod 52 into cylinder 49.

*Operation*

When it is desired to dump or discharge a load, not shown, from the dump box 14, an operator need only manipulate the conventional load dumping valve 22 whereby to supply fluid under pressure to the main or primary cylinder 16 and in turn to the secondary cylinders 49. Inasmuch as a much greater pressure is required to move the piston, not shown, of the main cylinder 16 (due to the weight of the load), pressure will be directed to the pistons (also not shown) of the secondary cylinders 49 to retract rods 52 and impart pivotal movements to the levers 27 about the pivotal axes 27a thereof. Initial movements of levers 27 cause lost motion movement between the bearings 28 and trunnion means 30 and permit the trunnion means 30 to impart unlocking movements of the latch bars 32, 37 through the medium of the linkage rods 42.

As the trunnion means reaches the upper limits of the bearings 28 and consequently the termination of the lost motion movement therebetween, as shown by dotted lines in FIGS. 2, 3, the latch bars 32, 37 are in an unlocked relationship with the rigid arms 44 in engagement with the adjacent surface of gate element 26. Further pivotal movement of levers 27 will move the gate element 26 from the full line position of FIG. 3 to the dotted line position thereof, thus fully opening the gate element 26 before initial dumping movements of the box 14.

When the gate element 26 has reached the fully opened dotted line position of FIG. 3, which is attained when the cylinders 49 and piston rods 52 are in their fully retracted position, full fluid pressure of the pump 20 is directed to the primary cylinder 16 and dumping operations of the box 14 commence. It will be noted that as the load is being discharged from box 14, any engagement thereof with the gate element 26 will cause same to swing outwardly about the trunnion means 30 thus preventing undue damage to the gate structure 25.

When the dumping operation above described has been completed, the operator moves the valve 22 to a position to return the fluid in cylinders 16, 49 to reservoir 21. The greater weight of the dump box 14, as opposed to the gate structure 25, causes the fluid in cylinder 16 to return to reservoir 21 first. Thereafter, when box 14 has returned to the position of FIG. 1, the fluid in cylinders 49 returns to reservoir 21 with the result that gate structure 25 will return to the full line locked position of FIGS. 1–7 under the action of gravity, thus automatically completing the cycle from a locked load-carrying position to an unlocked dumping position, and finally again to a locked load-receiving position during operation of the conventional dumping mechanism of the truck 10.

To positively insure that the gate structure 25 returns to a position wherein the latch bars 32, 37 may be engaged to lock the gate element 26 in the full-line position thereof, such as when the cab 11 of the truck 10 may be in an elevated position with respect to the gate structure 25, I provide a coiled torsion spring 53. Spring 53 is so mounted as to bias the gate element 26 toward the open discharge side 24 while still permitting free swinging movements outwardly therefrom upon engagement with a load being dumped.

My invention has been thoroughly tested and found to be completely satisfactory for the accomplishment of the above objects; and while I have disclosed a preferred embodiment thereof, same may well be capable of modification without departure from the scope and spirit of the appended claims.

What is claimed is:

1. A gate structure for use on box-equipped dump trucks having upstanding sides and an open discharge side, said structure comprising:
    (a) a gate element adapted to close said discharge side,
    (b) means including lost motion mechanism for mounting the upper end of said gate element to said box for upward and outward swinging movements away from said discharge side,
    (c) and locking mechanism securing said gate element to said box and releasable during operation of said lost motion mechanism, said means comprising lever means pivotally connected to the upper portion of said box in spaced relation to the discharge side thereof,
    (d) vertically elongated bearing means on the upper end portion of said gate element,
    (e) and horizontally disposed trunnion means on the outer end portion of said lever means slidably receivable in said bearing means, whereby said gate element is free to swing outwardly during all unlocked positions thereof about the axis of said trunnion means.

2. The structure defined in claim 1 in further combination with linkage interposed between said first mentioned means and said locking mechanism whereby to release the latter during operation of said lost motion mechanism.

3. The structure defined in claim 1 in which said lost motion mechanism also includes a rigid arm carried by said lever means intermediate its pivotal connection and said trunnion means and depending therefrom in downwardly diverging relationship to the plane of said gate element.

4. The structure defined in claim 3 in further combination with means for varying the diverging relationship of said arm with respect to the plane of said gate element.

5. The structure defined in claim 1 in further combination with power means for successively operating said lost motion mechanism to release said locking mechanism and thereafter imparting pivotal raising movements to said gate element, said power means including:
    (a) a primary fluid pressure operated device and control mechanism therefor for imparting pivotal raising movement to said box, and
    (b) a secondary fluid pressure operated device interposed between said lever means and said box and operatively connected between said primary fluid pressure operated device and said control mechanism.

6. A tail gate structure for use on box-equipped dump trucks having upstanding sides and an open rear end, said structure comprising:
    (a) a tail gate element adapted to close said open rear end, (b) releasable locking mechanism for securing said tail gate element to said box, (c) means including lost motion mechanism pivotally mounting the upper end of said tail gate element to the sides of said box for successively imparting releasing movements to said locking mechanism and upward and rearward swinging movements to said tail gate element, said means comprising a pair of levers pivotally connected one each to an opposite side of said box in forwardly spaced relation to the open end thereof, (d) vertically elongated bearing means on the upper end portion of said tail gate, (e) horizontally disposed trunnion means on the rear end portion of said lever means slidably received in said bearing means, (f) and a rigid arm carried by said lever means intermediate said pivotal connection and said trunnion means and diverging downwardly therefrom with respect to the plane of said tail gate.

7. The structure defined in claim 6 in which said trunnion means comprises a rod rigidly connecting the rear end portions of said levers and in further combination with power means for successively imparting movements to said lost motion mechanism and pivotal swinging movements to said levers.

8. The structure defined in claim 7 in which said power means includes a primary fluid pressure operated device and control mechanism therefor for imparting pivotal raising movements to said box, and a secondary fluid pressure operated device interposed between said lever means and said box and operatively connected between said primary fluid pressure operated device and said control means.

References Cited
UNITED STATES PATENTS

| | | |
|---|---|---|
| 864,768 | 9/1907 | Bloomingdale. |
| 1,380,601 | 6/1921 | Shafer. |
| 1,624,376 | 4/1927 | Venable _____ 298—8 |
| 2,213,385 | 9/1940 | Dailey _____ 298—23 |
| 3,254,919 | 6/1966 | Birchmeir _____ 298—23 |

BENJAMIN HERSH, *Primary Examiner.*

RICHARD J. JOHNSON, *Examiner.*